United States Patent
Nass

[15] 3,635,529
[45] Jan. 18, 1972

[54] MOTOR VEHICLE WHEEL ASSEMBLY

[72] Inventor: Walter R. Nass, Route 3, Box 505, Escondido, Calif. 92025

[22] Filed: June 24, 1969

[21] Appl. No.: 835,999

[52] U.S. Cl.............................301/65, 29/159.03, 29/521, 301/67
[51] Int. Cl.......................................B60b 1/08
[58] Field of Search.....................301/63, 64, 65, 64 SD, 67; 29/521, 508, 159.1, 159.3

[56] References Cited

UNITED STATES PATENTS

| | | | |
|---|---|---|---|
| 1,741,716 | 12/1929 | Hunt | 301/63 |
| 1,948,324 | 2/1934 | Woodward | 301/67 |
| 2,992,857 | 7/1961 | Lemmerz | 301/63 |
| 3,250,572 | 5/1966 | Walker | 301/65 |

FOREIGN PATENTS OR APPLICATIONS

| 1,003,061 | 2/1957 | Germany | 301/63 |
|---|---|---|---|

Primary Examiner—Richard J. Johnson
Attorney—Jessup & Beecher

[57] ABSTRACT

An improved wheel assembly is provided for motor vehicles, and the like, and which includes a central spider formed of any appropriate material, for example, of cast aluminum alloy or other nonferrous material, and a rim of any suitable material, such as steel or equivalent material; and in which a portion of the peripheral surface of the rim is depressed into a cavity in the outer edge of the spider so as to hold the two components of the wheel in a rigid assembly. An improved method for fabricating such a wheel assembly is also provided.

3 Claims, 5 Drawing Figures

PATENTED JAN 18 1972

3,635,529

INVENTOR:
Walter R. Nass
Jessup and Beecher
By Warren T. Jessup
ATTORNEYS

MOTOR VEHICLE WHEEL ASSEMBLY

BACKGROUND OF THE INVENTION

Automotive wheels having a highly polished central spider or spoke section have become most popular in recent years. It has been found that when the central spider or spoke section is formed of a nonferrous material, such as cast aluminum alloy, or other nonferrous metals or alloys, favorable results are achieved due to the improvement in styling that can be obtained.

It has been a practice to form the rims of such automotive wheels of steel. Problems have arisen in providing an adequate attachment of the resilient and malleable steel rim and the rigid nonferrous cast spoke or spider section without incurring high-manufacturing cost.

In the past, it has been attempted to rivet the steel rim to the nonferrous spider. However, due to the flexible characteristics of the steel rim and the relatively inflexible characteristics of the nonferrous spider, the rivets in the prior art structures have had a tendency to loosen. This results in air leaks where tubeless tires are used, and also in wheel assemblies which have a tendency to deteriorate.

One improved means for attaching the steel rim of such a wheel to the nonferrous spider is described, for example, in U.S. Pat. No. 3,250,571. The means described in the patent involves the use of steel inserts casted into the spider and welded to the steel rim. A somewhat similar arrangement is described in U.S. Pat. 3,250,572.

The improved wheel structure of the present invention has certain advantages over the assemblies shown and described in the aforesaid patents, in that the need for steel inserts in the nonferrous hub, or spider, section is obviated, and no welding operations are required.

In practice of the process of the present invention, for example, one or more depressions are provided around the periphery of the nonferrous central spider during or following the casting operation. These depressions, for example, extend radially inwardly. The spider section is press fit into a rim formed of steel, or other appropriate material, exhibiting malleable properties. The assembly is then placed in an hydraulic ram punch, for example, and the steel rim is depressed radially inwardly into the aforesaid depressions in the spider. Induction or other type of heating may be used to increase the malleability of the rim during the dimpling operation.

The resulting wheel, constructed in accordance with the teaching of the present invention, fulfills all the requisites of present day automotive wheels. That is, the attachment of the rim to the central spider section in the practice of the present invention is such that the resulting wheel assembly is capable of withstanding all normal working torques, and all overload torques that would ever be encountered during the use of the wheel. The resulting wheel is also capable of withstanding any side loading that might be encountered. The wheel assembly is airtight, which is essential for tubeless tires.

The wheel of the invention has the feature in that welding is obviated. The wheel also has a feature that central spider sections with, or without, a full outer peripheral rim may be used.

DETAILED DESCRIPTION OF THE ILLUSTRATED EMBODIMENT

Figure 1:
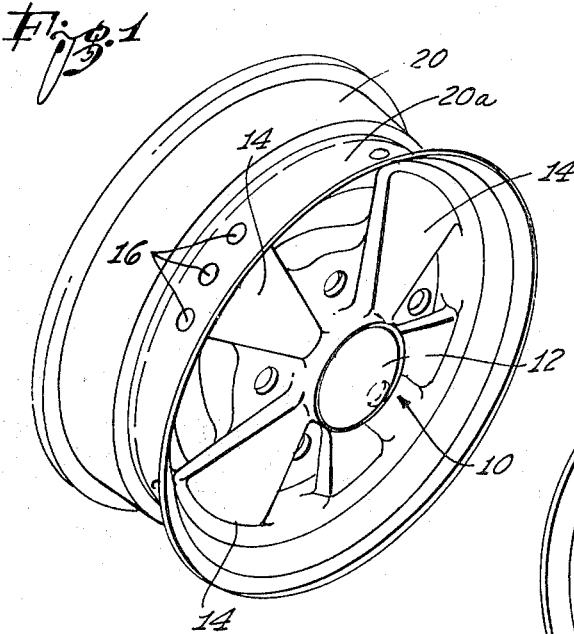
FIG. 1 is a perspective representation of an automotive wheel constructed in accordance with the concepts of the present invention.
Figure 2:
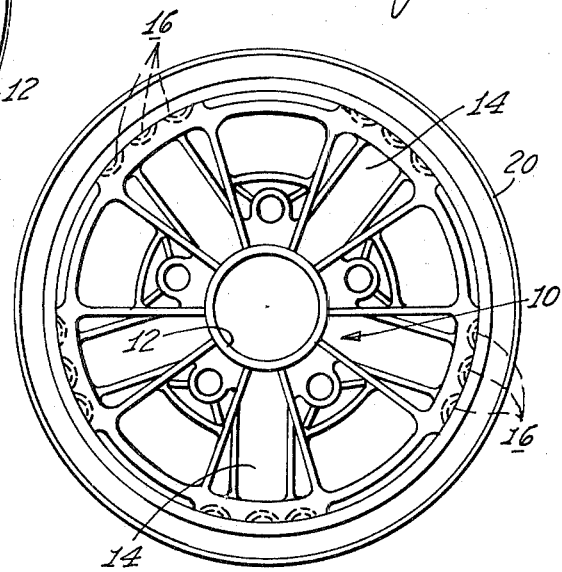
FIG. 2 is a side view of the wheel of FIG. 1.

The wheel of the present invention includes, for example, a central spider or spoke section 10. The spider 10 includes a central hub 12, and it may include a plurality of spokes 14 extending radially outwardly from the central section, although it need not necessarily be spoked.

Each of the spokes 14 has one or more radially extending depressions, or dimples, 16 formed at its outer edge, the dimples 16 extending inwardly toward the central hub 12. As mentioned above, the spider section 10 may be formed of cast aluminum alloy, or other appropriate nonferrous alloys, or other material. The dimples 16 may be conveniently formed in the spokes during the casting operation, or machined after the casting operation.

Figure 3:
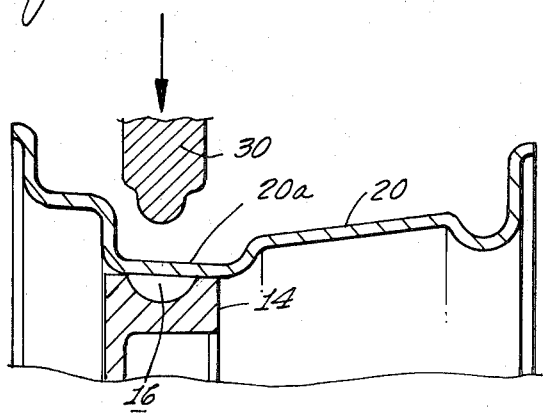
FIG. 3 is a diagrammatic representation of a construction step which is used in the fabrication process of the wheel of the present invention.
Figure 4:
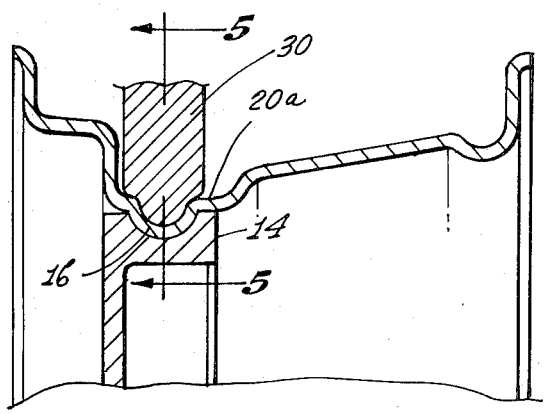
FIG. 4 is a diagrammatic representation, similar to FIG. 3, and showing the completion of the construction step of FIG. 3.

In the assembly of the wheel of the present invention, and in carrying out the process of the invention in one of its embodiments, the hub section 10 is placed in a press fit with a rim 20. The rim 20, for example, is formed of steel or other appropriate ferrous material, and it has a usual configuration. That is, the rim 20 has a central portion 20a which may be relatively thin, and which extends axially to cover the ends of the spokes 14. An appropriate hydraulic ram, such as designated 30 in FIGS. 3 and 4, is then brought down against the central portion 20a of the rim 20, so as to dimple the rim material down into the dimples 16 in the ends of the spokes, as shown by the steps of FIGS. 3 and 4. Other means may be used, if desired, to form the dimples in the rim material.

Figure 5:
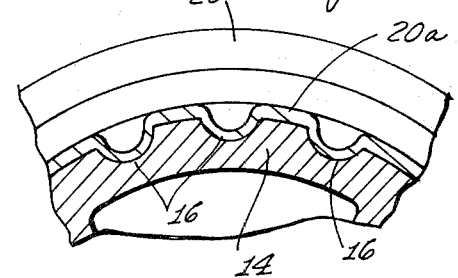
FIG. 5 is a partial section showing the result of the constructional operation, and taken essentially along the line 5—5 of FIG. 4.

The result is that the rim is firmly and rigidly secured to the spider section, as shown by the partial section of FIG. 5, this being achieved without the need for welding or any other extraneous operations. The malleable nature of the rim 20 when it is composed, for example, of steel permits it to be relatively easily dimpled down into the ends of the spokes 14, or equivalent peripheral section of the spider 10. The operation may be facilitated, as suggested above, by heating the rim during the dimpling process, this being achieved, for example, by induction heating or other appropriate means.

The wheel of the present invention has the desired characteristics of a spider section formed of a nonferrous metal such as aluminum, magnesium, or alloys thereof, and a rim formed of steel, or equivalent material. Moreover, the assembly of the invention is rigid and there is no tendency whatever for its components to loosen during the use of the wheel. Also, the wheel of the invention may be constructed quickly and expeditiously, and yet exhibit adequate strength characteristics as compared with the prior art wheels of the same general type.

What is claimed is:

1. A vehicle wheel assembly comprising:
a central spider section formed of nonferrous metal and providing a hub and a full outer peripheral ring, and having a plurality of circumferentially spaced, radially inwardly extending dimplelike depressions formed in the outer surface of said ring remote from said hub, said depressions being of diminishing cross section in at least the outer portion thereof; and a pneumatic tire rim of malleable metal surrounding said central spider section in concentric relationship therewith and with an inner surface engaging said ring;
said rim having dimples formed therein providing radially inwardly extending protuberances extending into the aforesaid depressions in the peripheral surface of said central spider section in a tight fit therewith an in intimate contact with at least the upper edge and the outer portion of the sides of said depressions, so as to hold said rim and said central spider section in a rigid unitary assembly.

2. The vehicle wheel assembly defined in claim 1, in which said central spider section includes a plurality of spokes extending radially outwardly from said hub, and in which said dimplelike depressions are formed in the outer edges of said spokes.

3. The vehicle wheel assembly defined in claim 1, in which said malleable rim is formed of steel and said central spider section is formed of aluminum alloy.

* * * * *

Notice of Adverse Decision in Interference

In Interference No. 98,196, involving Patent No. 3,635,529, W. R. Nass, MOTOR VEHICLE WHEEL ASSEMBLY, final judgment adverse to the patentee was rendered Jan. 28, 1977, as to claims 1, 2 and 3.

[*Official Gazette August 2, 1977.*]